US010944331B1

(12) United States Patent
Yee et al.

(10) Patent No.: US 10,944,331 B1
(45) Date of Patent: Mar. 9, 2021

(54) CONVERTER AND METHOD FOR CONTROLLING THEREOF

(71) Applicant: Sync Power Corp., Taipei (TW)

(72) Inventors: Hsian-Pei Yee, Taipei (TW); Ya-Wu Chung, Taipei (TW)

(73) Assignee: Sync Power Corp., Taipei (TW)

( * ) Notice: Subject to any disclaimer, the term of this patent is extended or adjusted under 35 U.S.C. 154(b) by 0 days.

(21) Appl. No.: 16/683,228

(22) Filed: Nov. 13, 2019

(51) Int. Cl.
*H02M 3/335* (2006.01)
*H02M 1/08* (2006.01)
*H02M 1/00* (2006.01)

(52) U.S. Cl.
CPC ....... *H02M 3/33592* (2013.01); *H02M 1/083* (2013.01); *H02M 2001/0058* (2013.01)

(58) Field of Classification Search
CPC ............. H02M 3/33592; H02M 1/083; H02M 2001/0058
See application file for complete search history.

(56) References Cited

U.S. PATENT DOCUMENTS

| 9,287,792 | B2* | 3/2016 | Telefus | H02M 3/33576 |
| 9,705,414 | B2* | 7/2017 | Ausseresse | H02M 3/33576 |
| 9,871,454 | B1* | 1/2018 | Yee | H02M 3/33523 |
| 2010/0110732 | A1* | 5/2010 | Moyer | H02M 3/33592 |
| | | | | 363/19 |
| 2013/0094252 | A1* | 4/2013 | Sato | H02M 3/33553 |
| | | | | 363/21.11 |
| 2015/0263628 | A1* | 9/2015 | Russell | H02M 3/156 |
| | | | | 363/21.03 |
| 2016/0233779 | A1* | 8/2016 | Cohen | H02M 3/33592 |

* cited by examiner

*Primary Examiner* — Emily P Pham
(74) *Attorney, Agent, or Firm* — CKC & Partners Co., LLC (57) ABSTRACT

A method for controlling a converter is disclosed. The converter includes a first switch and a second switch. The method includes: turning on then turning off the first switch for storing an energy in the converter; turning on then turning off the second switch for transferring the stored energy in the converter; and turning on the second switch again thereby injecting the energy into the converter, and then turning off the second switch to increase levels of oscillations.

18 Claims, 11 Drawing Sheets

CONVERTER AND METHOD FOR CONTROLLING THEREOF

BACKGROUND

Technical Field

The present disclosure relates to a method for controlling a converter. More particularly, the present disclosure relates to a method for controlling a converter to achieve a zero voltage switching.

Description of Related Art

A DC voltage is commonly required for operating an electric device. Therefore, an AC-DC power supply or a DC-DC power supply is needed for outputting a rectified DC voltage. A converter is commonly employed in such AC-DC (or DC-DC) power supply to convert a voltage. Many kinds of circuit topologies such as a forward topology, a flyback topology, a CUK topology, a full bridge topology, a half bridge topology and a push pull topology are used in the converter. Conventionally, a converter may include a primary side rectifier having a primary side switch and a secondary side rectifier having a secondary side switch for modulating an outputted voltage.

In switch mode power supplies utilizing the aforementioned converters, a zero voltage switching (ZVS) is desired for the primary side switch; because of a relatively high voltage on the primary side switch that inducing a turn-on loss.

There exists a parasitic tank circuit oscillation in when the secondary side rectifier is turned off completing the discharging of the transformer energy, and before the turn on of the primary side switch. However, the parasitic tank circuit oscillation while provides a voltage valley, it does not produce a ZVS for the primary side switch to take advantage of.

SUMMARY

According to one aspect of the present disclosure, a method for controlling a converter is provided. The converter includes a first switch and a second switch. The method includes: turning on then turning off the first switch for storing an energy in the converter; turning on then turning off the second switch for transferring the stored energy in the converter; turning on the second switch again and then turning off the second switch thereby injecting the energy into the converter for generating oscillations so as to achieve a near zero voltage when the first switch being turned on again in a next operation cycle.

According to another aspect of the present disclosure, a method for controlling a converter is provided. The converter includes a primary side circuit and a secondary side circuit. The method includes: providing a first switch in the primary side circuit; providing a second switch in the secondary side circuit; turning on then turning off the first switch for storing an energy in the converter; turning on then turning off the second switch for transferring the stored energy in the converter; turning on the second switch again and then turning off the second switch for injecting energy into the converter for generating oscillations so as to achieve a near zero voltage synchronously with the first switch being turned on again in a next operation cycle.

According to still another aspect of the present disclosure, a converter is provided. The converter includes a first switch and a second switch. The first switch is turned on then turned off for storing an energy in the converter, the second switch is turned on then turned off for transferring the stored energy in the converter; the second switch is turned on again thereby injecting the energy into the converter, and the second switch is turned off to increase levels of oscillations.

According to further another aspect of the present disclosure, a converter is provided. The converter includes a primary side circuit and a secondary side circuit. The primary side circuit includes a first switch. The secondary side circuit includes a second switch. The first switch is turned on then turned off for storing an energy in the converter, the second switch is turned on then turned off for transferring the stored energy in the converter, the second switch is turned on again for injecting the energy into the converter, synchronously with the converter oscillations and the second switch is then turned off to increase levels of oscillations.

DETAILED DESCRIPTION

Figure 1:
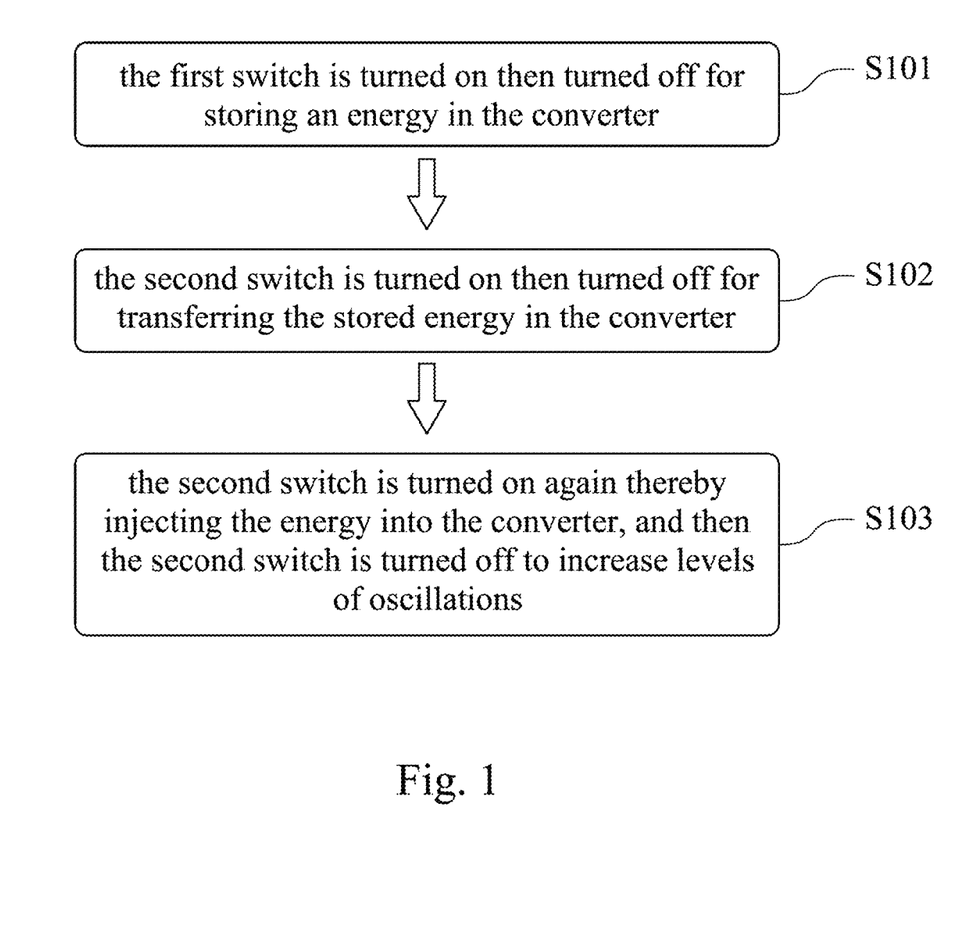
FIG. 1 is a flow chart showing a method for controlling a converter according to one embodiment of the present disclosure.

FIG. 1 is a flow chart showing a method for controlling a converter according to one embodiment of the present disclosure. In FIG. 1, the method for controlling the converter includes a step S101, a step S102 and a step S103. The converter includes a first switch and a second switch. In the step S101, the first switch is turned on then turned off for storing an energy in the converter. In the step S102, the second switch is turned on then turned off for transferring the stored energy in the converter. In the step S103, the second switch is turned on again and then the second switch is turned off thereby injecting the energy into the converter for generating oscillations so as to achieve a near zero voltage when the first switch being turned on again in a next operation cycle.

Figure 2:
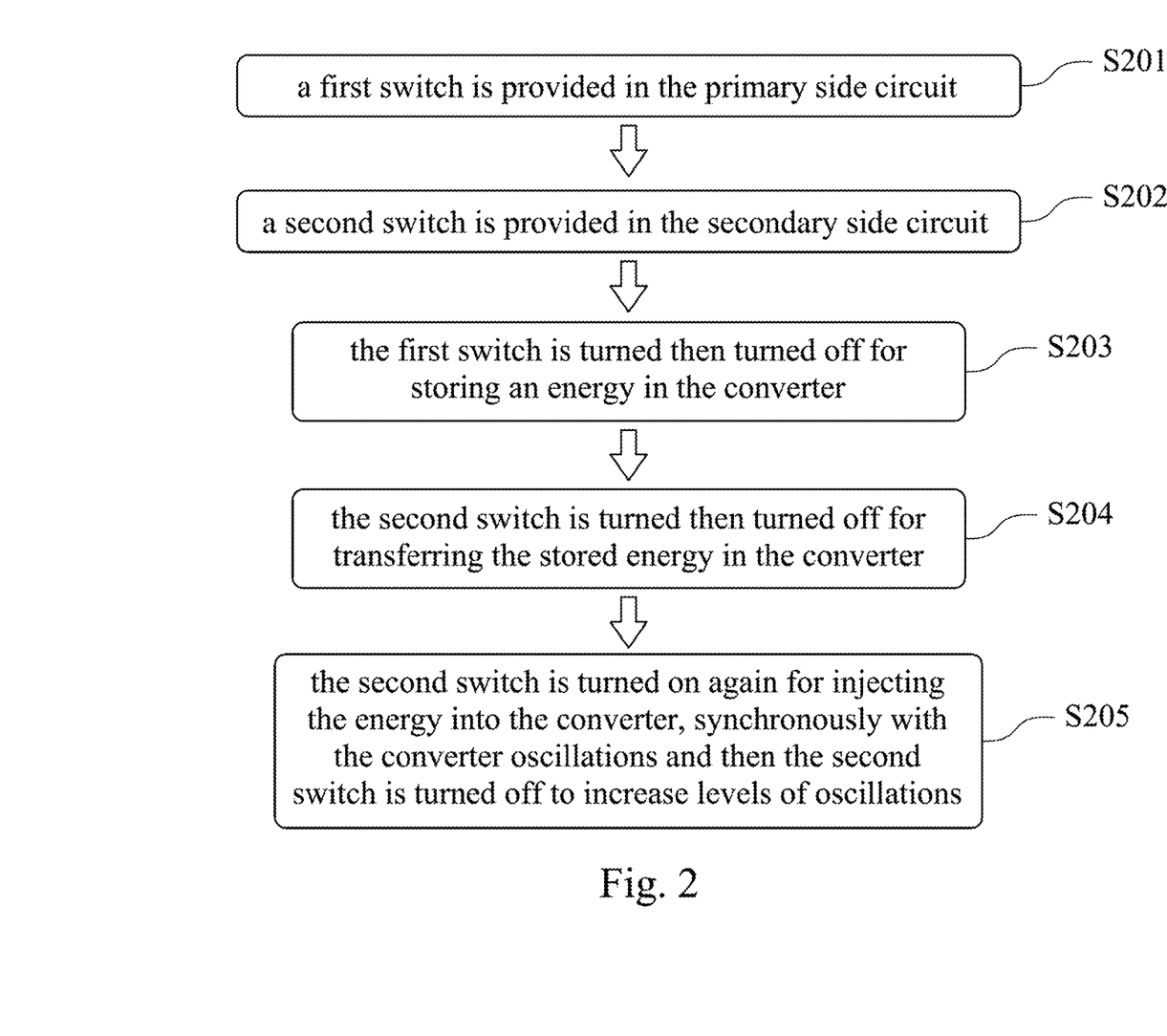
FIG. 2 is a flow chart showing a method for controlling a converter according to another embodiment of the present disclosure.

FIG. 2 is a flow chart showing a method for controlling a converter according to another embodiment of the present disclosure. In FIG. 2, the method for controlling the converter includes a step S201, a step S202, a step S203, a step S204 and a step S205. The converter includes a primary side circuit and a secondary side circuit. In the step S201, a first switch is provided in the primary side circuit. In the step S202, a second switch is provided in the secondary side circuit. In the step S203, the first switch is turned then turned off for storing an energy in the converter. In the step S204, the second switch is turned then turned off for transferring the stored energy in the converter. In the step S205, the second switch is turned on again and then the second switch is turned off for injecting the energy into the converter for generating oscillations so as to achieve a near zero voltage synchronously with the first switch being turned on again in a next operation cycle.

It should be known that the method of the present disclosure can be applied on a converter having a single circuit with two switches or a converter having a dual-sided circuit with two switches.

Figure 3:
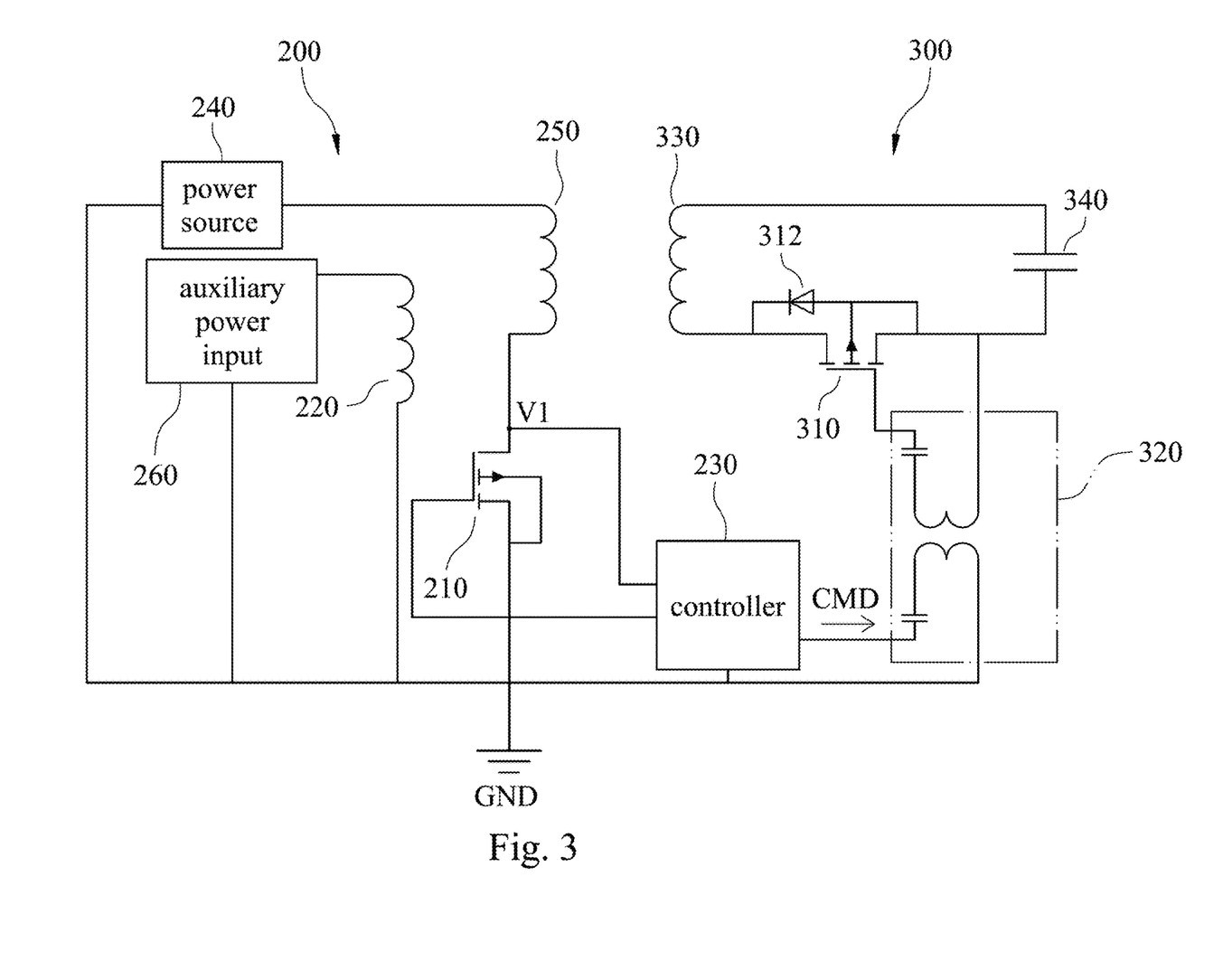
FIG. 3 shows a circuit topology of a converter that utilizing the method of FIG. 1.

FIG. 3 shows a circuit topology of a converter that utilizing the method of FIG. 1. In FIG. 3, the converter includes a single circuit with a primary side 200 and a secondary side 300. The primary side 200 includes a first switch 210, an auxiliary winding 220, and a controller 230. The first switch 210 has a first voltage V1 thereon. The auxiliary winding 220 has a first terminal and a second terminal, wherein the first terminal of the auxiliary winding 220 may be coupled to a conventional auxiliary power input circuit, and the second terminal of the auxiliary winding 220 may be coupled to a ground GND, but the disclosure is not limited thereto.

The controller 230 is coupled to the first switch 210 and capable of retrieving the first voltage V1. Specifically, the controller 230 has an input terminal coupled to a first terminal of the first switch 210, a first output terminal coupled to a control terminal of the first switch 210, a second output terminal, and a ground terminal coupled to a second terminal of the first switch 210 and the ground GND.

The primary side 200 may further include a power source 240, a first winding 250, and an auxiliary power input 260. The power source 240 may be a conventional AC source input including an AC power, a full bridge rectifier, etc., wherein a first terminal of the power source 240 may be coupled to a first terminal of the first winding 250, and a second terminal of the power source 240 may be coupled to the ground GND. A second terminal of the first winding 250 is coupled to the first terminal of the first switch 210 and the input terminal of the controller 230. A first terminal of the auxiliary power input 260 is coupled to a first terminal of the auxiliary winding 220, and a second terminal of the auxiliary power input 260 is coupled to the ground GND.

The secondary side 300 is coupled to the primary side 200 and includes a second switch 310 and a pulse transformer 320 coupled to the second switch 310. Specifically, the second switch 310 may be an SRMOS (which operates as a body diode 312 when being turned off) and has a first terminal, a second terminal, and a control terminal. The pulse transformer 320 has a first input terminal coupled to the first terminal of the second switch 310, a second input terminal coupled to the second output terminal of the controller 230, an output terminal coupled to the control terminal of the second switch 310, and a ground terminal coupled to the ground GND. In one embodiment, the pulse transformer 320 turns off the second switch 310 in response to a command CMD from the controller 230.

The secondary side 300 may further include a second winding 330 and an output capacitor 340. The second winding 330 has a first terminal and a second terminal, wherein the second terminal of the second winding 330 is coupled to the second terminal of the second switch 310. The output capacitor 340 has a first terminal and a second terminal, wherein the first terminal of the output capacitor 340 is coupled to the first terminal of the second winding 330, and the second terminal of the output capacitor 340 is coupled to the first terminal of the second switch 310.

Figure 4:
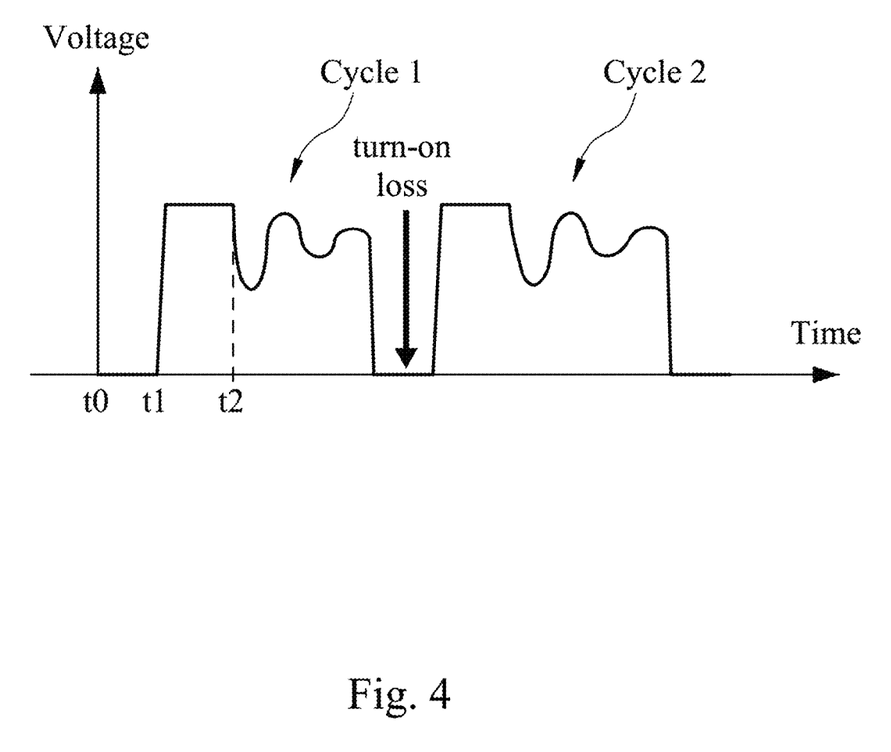
FIG. 4 shows an operation mode of the converter of FIG. 3 without a zero voltage switching.
Figure 5:
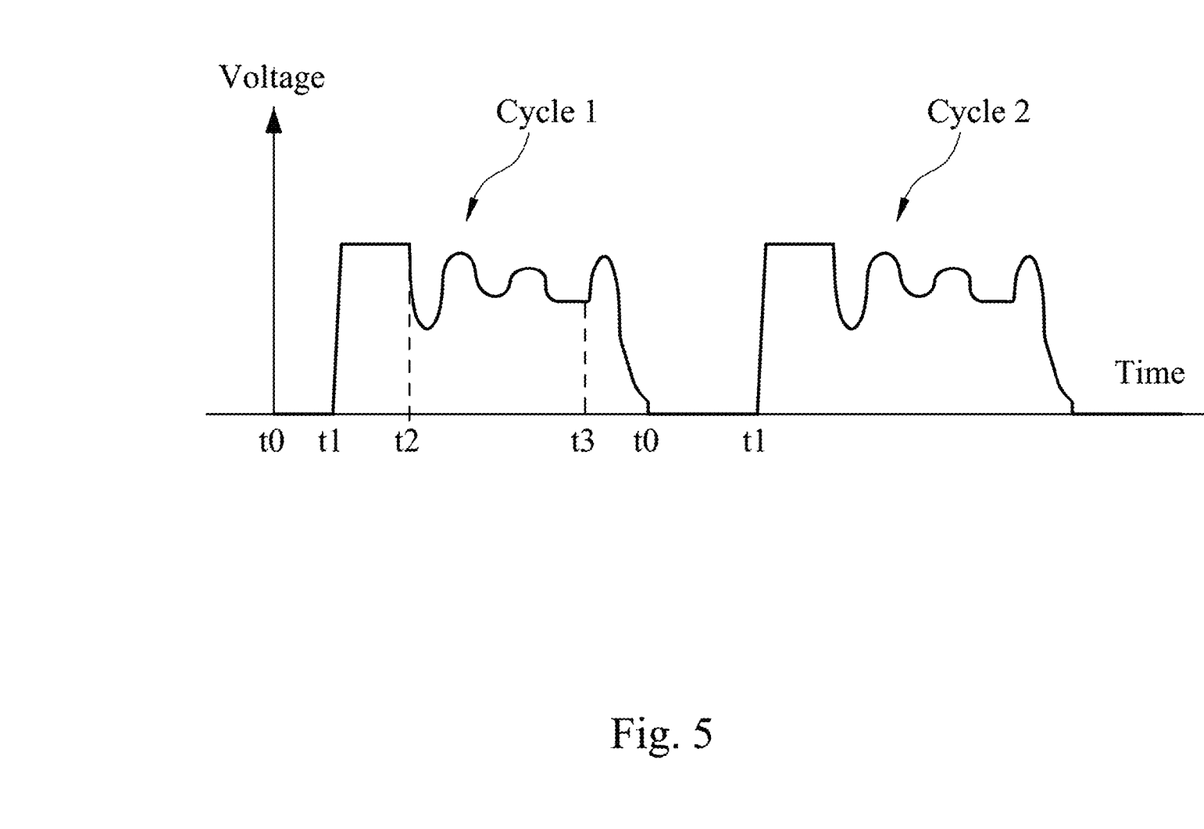
FIG. 5 shows an operation mode of the converter of FIG. 3 with a zero voltage switching.

FIG. 4 shows an operation mode of the converter of FIG. 3 without a zero voltage switching. FIG. 5 shows an operation mode of the converter of FIG. 3 with a zero voltage switching. In FIG. 4, while in operating the converter in FIG. 3, firstly, the first switch 210 is turned on then turned off (duration from a timing point t0 to a timing point t1) for storing energy and the controller 230 retrieves the first voltage V1 as a specific voltage. And then, the second switch 310 is turned on then turned off (duration from the timing point t1 to a timing point t2) for transferring the stored energy in the converter, an oscillation waveform of the specific voltage is generated after the second switch 310 is turned off in a cycle 1. In FIG. 4, when the first switch 210 is turned on again in a next cycle (cycle 2), a relatively high voltage exists, thereby inducing a turn-on loss (or switch loss), therefore the zero voltage switching is not achieved. In FIG. 5, an extra energy is injected into the converter by re-opening the second switch 310 (i.e. at a timing point t3, after closing the second switch 310 in the cycle 1), synchronously with the converter oscillations, and then the second switch 310 is turned off (i.e. before re-opening the first switch 310 in the cycle 2) to increase levels of oscillation (or from another view, to produce new oscillations in addition to the original converter oscillations). The increased level of the oscillations is generated due to extra oscillations generated by injecting an extra energy into the converter. When the first switch 210 is turned on again during the increased levels of the oscillations, a relatively low voltage exists thereby reducing energy consumption so that a turn-on loss (a switch loss) of the first switch S1 can be reduced. The time that the first switch 310 re-opened in the cycle 2 is determined by detecting a lowest voltage value when the extra oscillations started.

Figure 6:
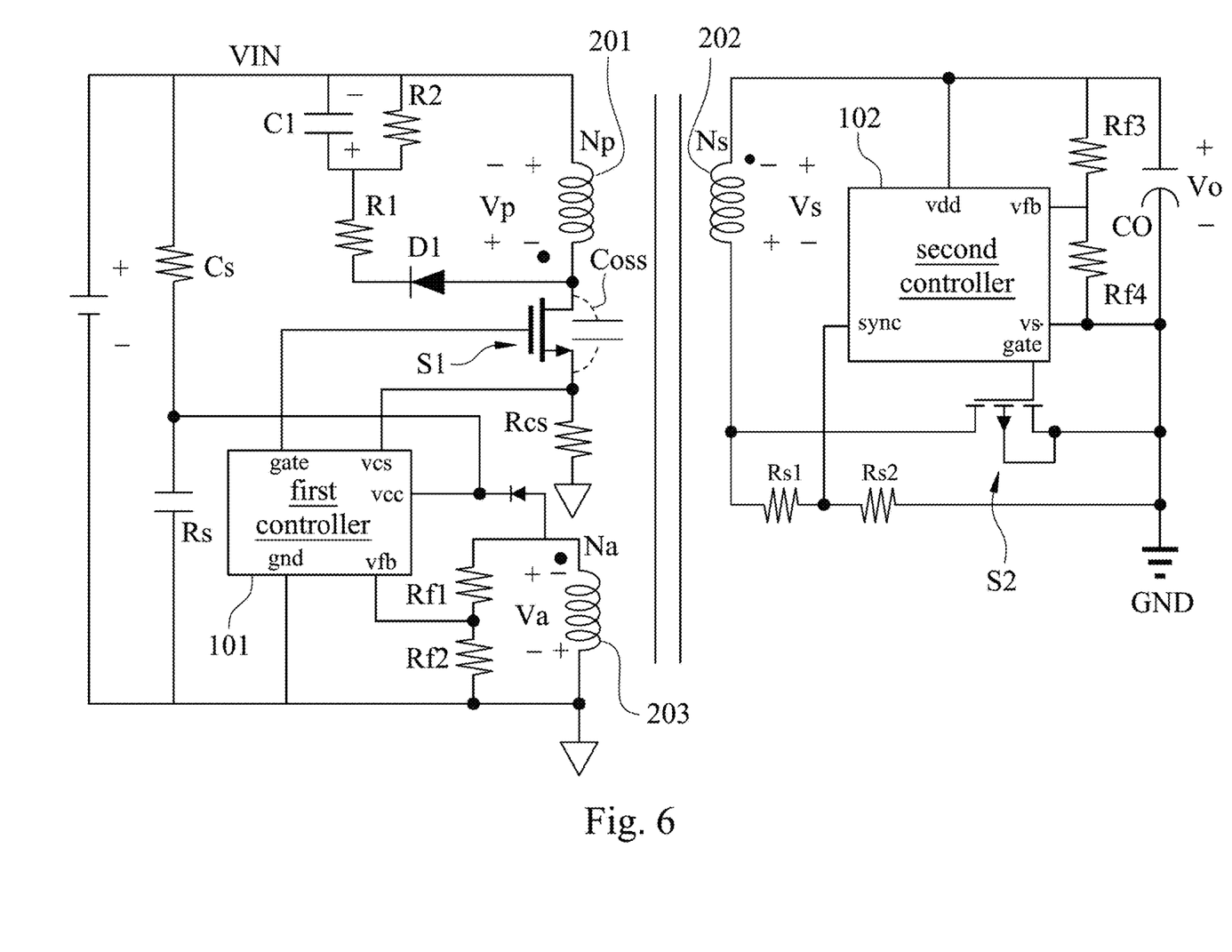
FIG. 6 shows a circuit topology of a converter that utilizing the method of FIG. 2.

FIG. 6 shows a circuit topology of a converter that utilizing the method of FIG. 2.

In FIG. 6, a converter includes a primary side circuit and a secondary side circuit. The primary side circuit includes a first controller 101 and a first switch S1 controlled by the first controller 101. The secondary side circuit includes a second controller 102 and a second switch S2 controlled by the second controller 102.

The second controller 102 controls the second switch S2 to be turned on or turned off to feedback a message to the primary side circuit; and the first controller 101 controls the first switch S1 to be turned on or turned off to transfer energy to the secondary side circuit if the first controller 101 receives the message. In one example, the first switch S1 or the second switch S2 may be a MOSFET, and when the first switch S1 is turned on, the second switch S2 should be turned off to prevent the damage of the MOSFET.

The primary side circuit includes a first winding 201 and an auxiliary winding 203. The first winding 201 is coupled with the first switch S1 and the first controller 101. The auxiliary winding 203 is coupled with the first controller 101.

The secondary side circuit includes a second winding 202. The second winding 202 is coupled with the second switch S2.

The first winding 201 of the primary side circuit is coupled with the second winding 202 of the secondary side circuit to transfer energy from the primary side circuit to the secondary side circuit.

The message is transferred from the primary side circuit to the secondary side circuit through the coupling between the second winding 202 and the auxiliary winding 203.

In the converter of FIG. 6, the message is exchanged between the first controller 101 and the second controller 102, thereby alternately dominating a regulation of an output voltage between the primary side circuit and the secondary side circuit in accordance with the message. Furthermore, the primary side circuit dominates the regulation of the output voltage in an initial state, and the secondary side circuit dominates the regulation of the output voltage in a steady state. Initially, when a pre-determined secondary side circuit modulation voltage is greater than a pre-determined primary side circuit modulation voltage; the first controller 101 and the second controller 102 are not in operation, and the primary side circuit is activated through a charging procedure (i.e., in FIG. 6, when the input voltage VIN is received in the primary side circuit, the capacitor C1 is charged through the resistance R1 to provide the required electric power to activate the primary side circuit). Then, the output voltage Vo is increased to the pre-determined primary side circuit modulation voltage. Meanwhile, the primary side circuit dominates the modulation of the output voltage Vo, and the secondary side circuit is not in operation. When the output voltage Vo is greater than a threshold voltage level, the secondary side circuit starts to operate and dominate the modulation of the output voltage Vo. At this moment, the primary side circuit is passive, and the secondary circuit is active. The secondary side circuit turns on then turns off the second switch S2 to transmit the message to the primary side circuit, and the primary side circuit turns on then turns off the first switch S1 to transmit energy to the secondary side circuit after receiving the message. And then, the output voltage Vo can be increased to the pre-determined secondary side circuit modulation voltage after receiving the energy.

More specifically, in the converter of FIG. 6, the energy is transmitted from the primary side circuit to the secondary side circuit through a coupling of the first winding 201 and the second winding 202. The message is fed back to the primary side circuit through the coupling between the second winding 202 and the auxiliary winding 203. The first switch S1 is coupled to a control terminal gate of the first controller 101, and the second switch S2 is coupled to a control terminal gate of the second controller 102. In FIG. 6, the second controller 102 can be a synchronous rectifier (SR) controller.

In the flowing FIG. 7, FIG. 8, FIG. 9 and FIG. 10, the symbol Tonp indicates that the period that the first switch S1 is turned on; the symbol Tons indicates that the period that the second switch S2 is turned on; the symbol Toff indicates that both of the first switch S1 and the second switch S2 are turned off.

Figure 7:
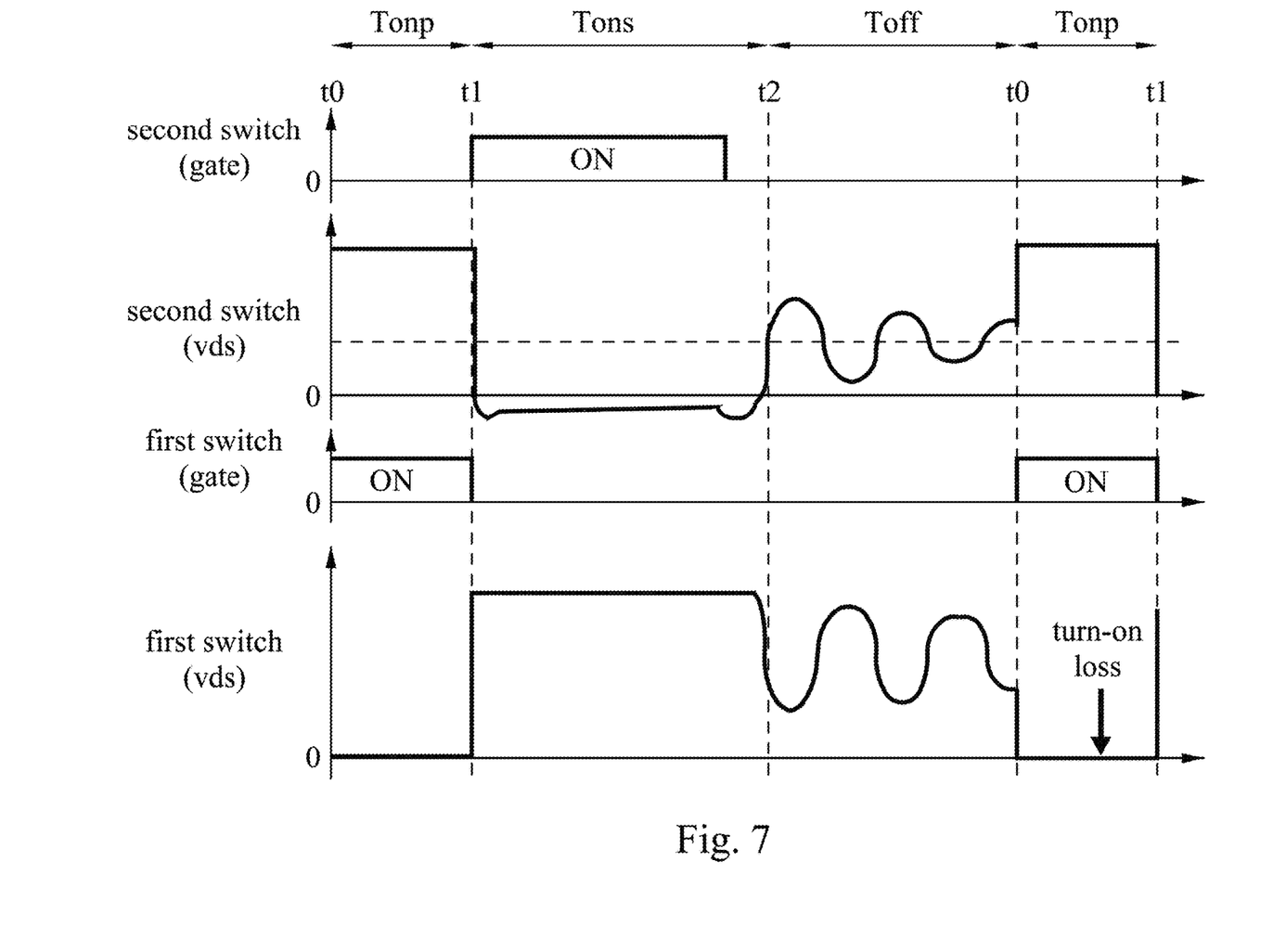
FIG. 7 shows the converter of FIG. 6 operated under a heavy load without a zero voltage switching.
Figure 8:
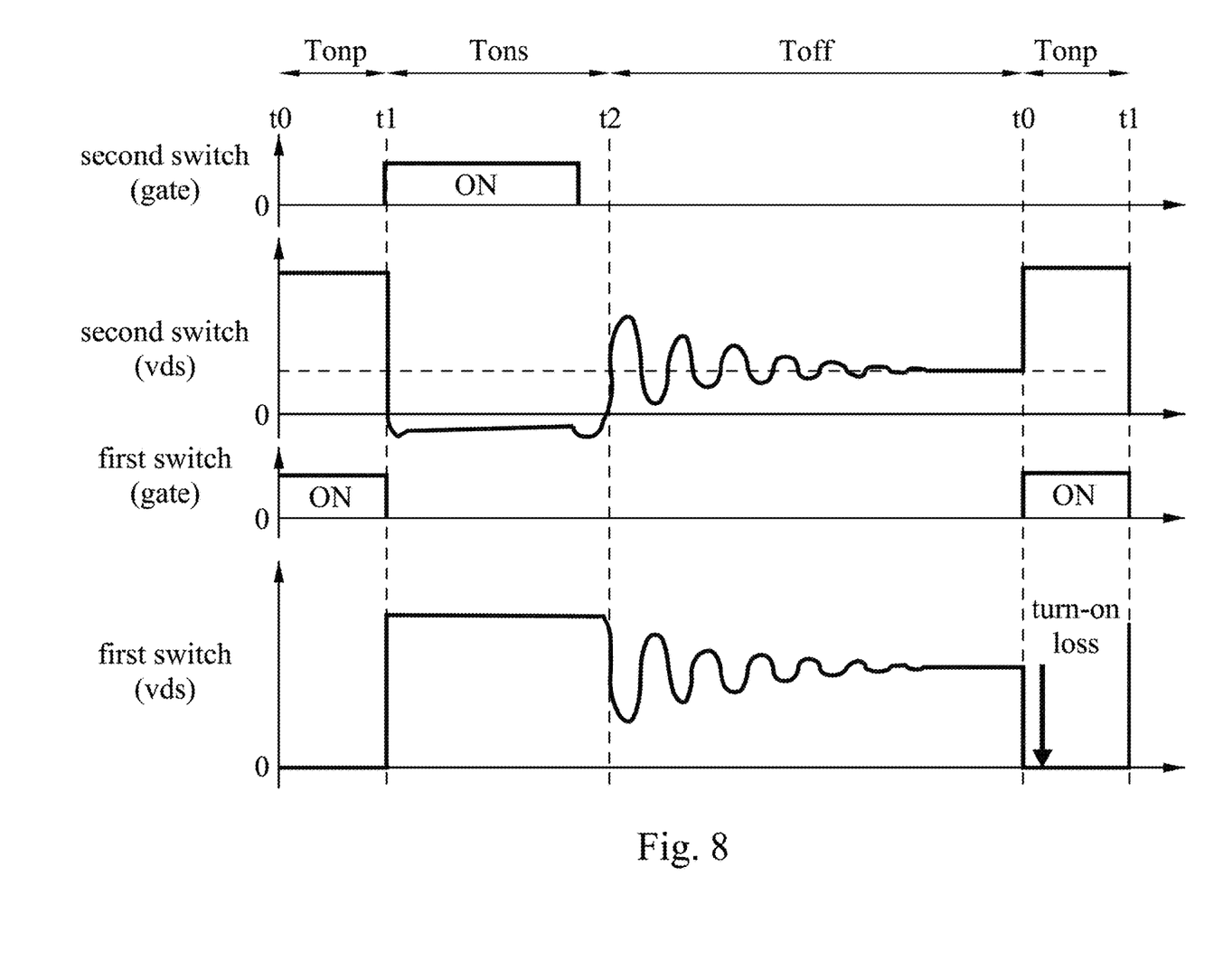
FIG. 8 shows the converter of FIG. 6 operated under a light load without a zero voltage switching.

FIG. 7 shows the converter of FIG. 6 operated under a heavy load without a zero voltage switching. FIG. 8 shows the converter of FIG. 6 operated under a light load without a zero voltage switching. The operation procedure of the converter of FIG. 6 has been described in the aforementioned paragraphs. The situations that the converter operated with and without a zero voltage switching will be then described.

FIG. 7 and FIG. 8 show the converter of FIG. 6 operated under a heavy load and a light load respectively. In FIG. 7 and FIG. 8, in the situation that without a zero voltage switching, the first switch S1 is turned on then turned off for storing an energy in the converter, and then the second switch S2 is turned then turned off for transferring the stored energy in the converter. At the time, it can be observed that the oscillations of the converter are generated. In FIG. 7 and FIG. 8, the oscillation frequency and the oscillation amplitude are different under a heavy load and a light load respectively. When in the next cycle that the first switch S1 turned on again, a relatively high voltage exists, thereby inducing a turn-on loss (or switch loss), therefore the zero voltage switching is not achieved.

Figure 9:
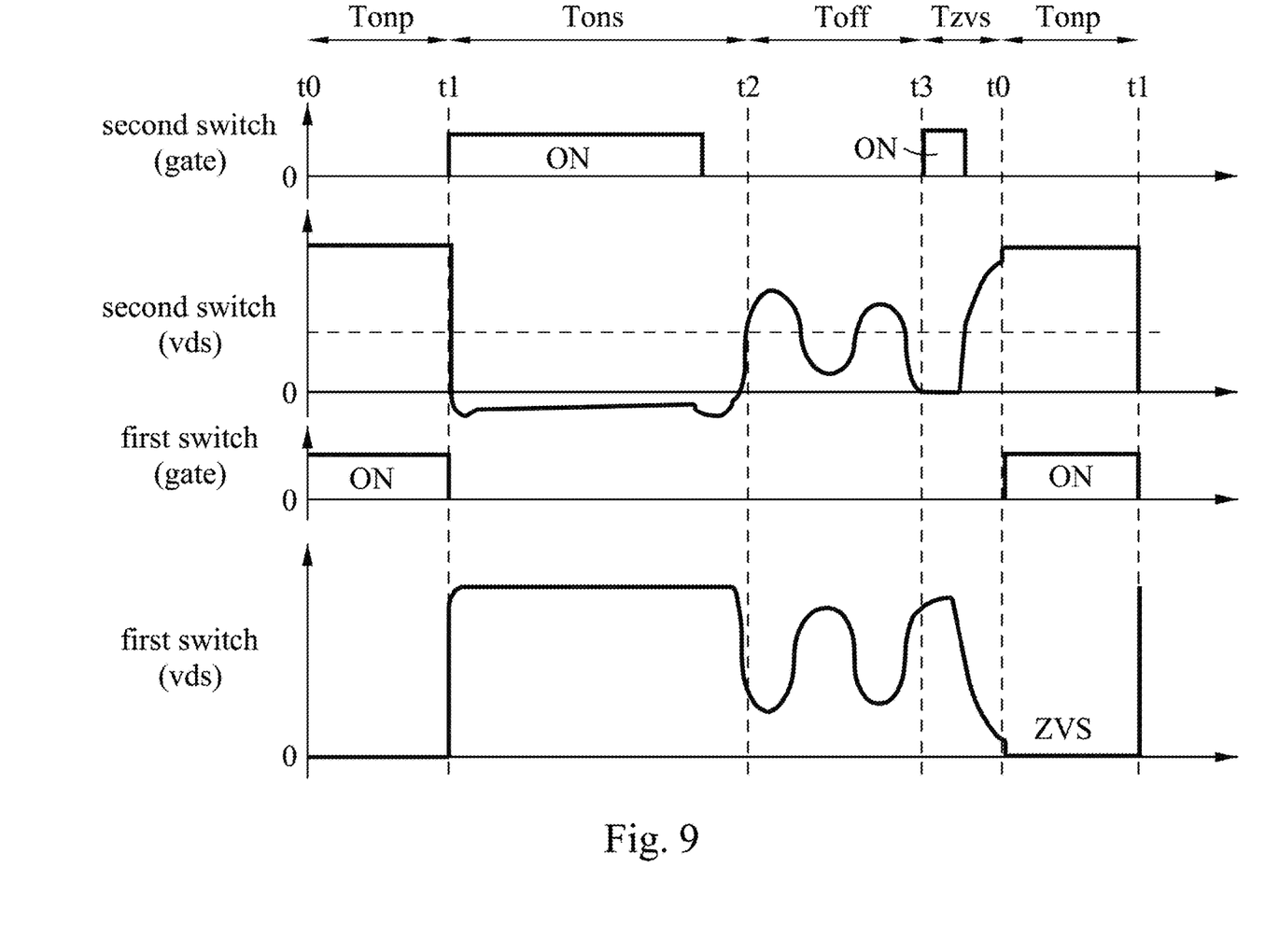
FIG. 9 shows the converter of FIG. 6 operated under a heavy load with a zero voltage switching.
Figure 10:
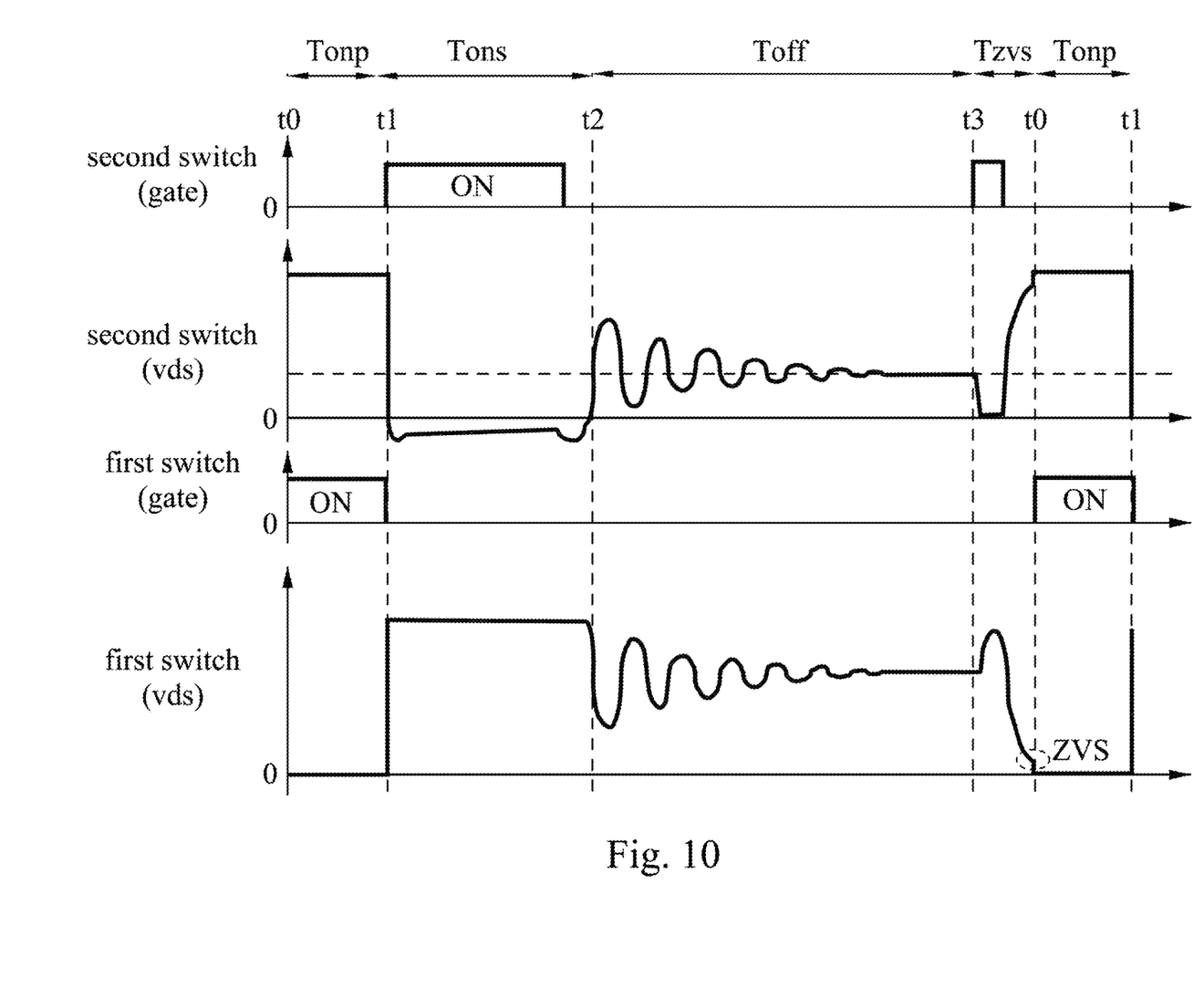
FIG. 10 shows the converter of FIG. 6 operated under a light load with a zero voltage switching.

FIG. 9 shows the converter of FIG. 6 operated under a heavy load with a zero voltage switching. FIG. 10 shows the converter of FIG. 6 operated under a light load with a zero voltage switching. For reducing the turn-on loss in FIG. 7 and FIG. 8, an extra procedure that achieving the zero voltage switching (ZVS) is used. In FIG. 9 and FIG. 10, when the second switch S2 is turned off, the second switch S2 is turned on again for injecting energy into the converter, synchronously with the converter oscillations and then the second switch S2 is turned off to increase levels of oscillations. Therefore, in the next cycle, when the first switch S1 is turned on again during the increased levels of the oscillations, a relatively low voltage exists thereby reducing energy consumption so that a turn-on loss (a switch loss) of the first switch S1 can be reduced. Accordingly, the ZVS allows the first switch S1 to turn on using minimal energy, while a non ZVS of the first switch S1 turned on is energy dissipative according to the voltage levels across the first switch S1. Furthermore, a capacitor Coss is disposed at a drain and a source of the first switch S1, thereby absorbing an energy by the capacitor when the first switch S1 is turned off for recovering at turn on. In detail, the energy is injected into the converter in the form of an inductor current, and then turning off the second switch S2. With the second switch S2 turned off, the continuous current from the inductor will now discharge the capacitance Coss across the first switch S1 in the primary side circuit, and induce an extra oscillation which is used as near zero voltage switching of the first switch S1 in the primary side circuit.

Figure 11:
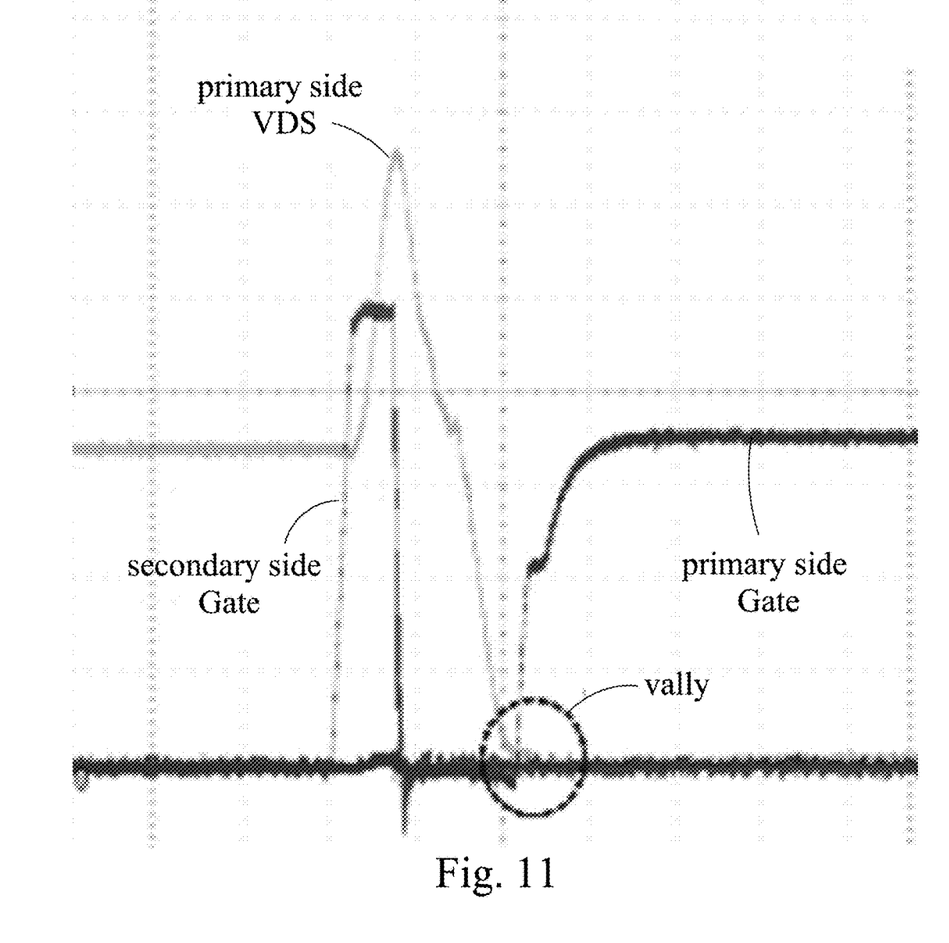
FIG. 11 is a waveform diagram showing a zero voltage switching operation of the converter of FIG. 6.

FIG. 11 is a waveform diagram showing a zero voltage switching operation of the converter of FIG. 6. It is clearly shown that by introducing the method mentioned above, a voltage value of the primary side VDS(=VIN) is achieved to zero at a valley. While $Q_{total-loss}$=Frequency×Coss×VIN (VDS), therefore the $Q_{total-loss}$=Frequency×Coss×0 V=0. Therefore, energy consumption can be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for controlling a converter, wherein the converter comprises a first switch and a second switch, the method comprising:
   turning on then turning off the first switch for storing an energy in the converter;
   turning on then turning off the second switch for transferring the energy in the converter; and
   turning on the second switch again and then turning off the second switch thereby injecting the energy into the converter for generating oscillations so as to achieve a near zero voltage when the first switch being turned on again in a next operation cycle;

wherein the converter further comprises a controller and a pulse transformer coupled to the second switch;

the controller is coupled to the first switch and capable of retrieving a voltage of a first terminal of the first switch, the controller has an input terminal coupled to the first terminal of the first switch, a first output terminal coupled to a control terminal of the first switch, a second output terminal, and a ground terminal coupled to a second terminal of the first switch and a ground; and the second switch has a first terminal, a second terminal, and a control terminal, the pulse transformer has a first input terminal coupled to the first terminal of the second switch, a second input terminal coupled to the second output terminal of the controller, an output terminal coupled to the control terminal of the second switch, and a ground terminal coupled to the ground, and the pulse transformer turns off the second switch in response to a command from the controller.

2. The method of claim 1, further comprising:

turning on the first switch during a plurality of increased levels of oscillations to reduce a turn-on loss of the first switch.

3. The method of claim 2, further comprising:

disposed a capacitor at a drain and a source of the first switch; and absorbing the energy by the capacitor when the first switch is turned off for recovering at turn on.

4. A method for controlling a converter, wherein the converter comprises a primary side circuit and a secondary side circuit, the method comprising:

providing a first switch and a first controller in the primary side circuit;

providing a second switch and a second controller in the secondary side circuit;

turning on then turning off the first switch for storing an energy in the converter;

turning on then turning off the second switch for transferring the energy in the converter;

turning on the second switch again and then turning off the second switch for injecting the energy into the converter for generating oscillations so as to achieve a near zero voltage synchronously with the first switch being turned on again in a next operation cycle; and exchanging a message between the first controller and the second controller, thereby alternately dominating a regulation of an output voltage between the primary side circuit and the secondary side circuit in accordance with the message;

wherein the primary side circuit comprises a first winding and an auxiliary winding, the secondary side circuit comprises a second winding, the first winding is coupled with the first switch, the first controller and the second winding, the second winding is coupled with the second switch, the second controller and the auxiliary winding, the auxiliary winding is coupled with the first controller, and the message is transferred from the primary side circuit to the secondary side circuit through a coupling between the second winding and the auxiliary winding.

5. The method of claim 4, further comprising:

turning on the first switch during a plurality of increased levels of oscillations to reduce a turn-on loss of the first switch.

6. The method of claim 5, further comprising:

disposing a capacitor at a drain and a source of the first switch; and absorbing the energy by the capacitor when the first switch is turned off for recovering at turn on.

7. The method of claim 4, wherein the primary side circuit dominates the regulation of the output voltage in an initial state, and the secondary side circuit dominates the regulation of the output voltage in a steady state.

8. The method of claim 4, wherein the primary side circuit transmits the energy to the secondary side circuit when the secondary side circuit requires the energy.

9. The method of claim 4, further comprising:

controlling the second controller to turn off the second switch to feed back the message to the primary side circuit; and controlling the first controller to enable the primary side circuit to inject the energy to the secondary side circuit if the first controller detects the message.

10. The method of claim 9, wherein the second controller is a synchronous rectifier (SR) controller.

11. A converter, comprising:

a first switch; and a second switch;

wherein the first switch is turned on then turned off the first switch for storing an energy in the converter, the second switch is turned on then turned off for transferring the energy in the converter; the second switch is turned on again thereby injecting the energy into the converter, and the second switch is turned off to increase levels of oscillation;

wherein the converter further comprises a controller and a pulse transformer coupled to the second switch;

the controller is coupled to the first switch and capable of retrieving a voltage of a first terminal of the first switch, the controller has an input terminal coupled to the first terminal of the first switch, a first output terminal coupled to a control terminal of the first switch, a second output terminal, and a ground terminal coupled to a second terminal of the first switch and a ground; and the second switch has a first terminal, a second terminal, and a control terminal, the pulse transformer has a first input terminal coupled to the first terminal of the second switch, a second input terminal coupled to the second output terminal of the controller, an output terminal coupled to the control terminal of the second switch, and a ground terminal coupled to the ground, and the pulse transformer turns off the second switch in response to a command from the controller.

12. The converter of claim 11, wherein the first switch is turned on during a plurality of increased levels of oscillations to reduce a turn-on loss of the first switch.

13. The converter of claim 12, further comprising:

a capacitor disposed at a drain and a source of the first switch, wherein the capacitor absorbs the energy when the first switch is turned off for recovering at turn on.

14. A converter, comprising:

a primary side circuit, wherein the primary side circuit comprises a first switch;

a secondary side circuit, wherein the secondary side circuit comprises a second switch;

a first controller located in the primary side circuit, wherein the first switch is controlled by the first controller; and a second controller located in the secondary side circuit, wherein the second switch is controlled by the second controller;

wherein the first switch is turned on then turned off for storing an energy in the converter, the second switch is turned on then turned off for transferring the energy in the converter, the second switch is turned on again for injecting the energy into the converter, synchronously with the converter oscillations and the second switch is then turned off to increase levels of oscillations;

wherein a message is exchanged between the first controller and the second controller, thereby alternately dominating a regulation of an output voltage between the primary side circuit and the secondary side circuit in accordance with the message;

wherein the primary side circuit comprises a first winding and an auxiliary winding, the secondary side circuit comprises a second winding, the first winding is coupled with the first switch, the first controller and the second winding, the second winding is coupled with the second switch, the second controller and the auxiliary winding, the auxiliary winding is coupled with the first controller, and the message is transferred from the primary side circuit to the secondary side circuit through a coupling between the second winding and the auxiliary winding.

15. The converter of claim 14, wherein the primary side circuit dominates the regulation of the output voltage in an initial state, and the secondary side circuit dominates the regulation of the output voltage in a steady state.

16. The converter of claim 14, wherein the primary side circuit transmits the energy to the secondary side circuit when the secondary side circuit requires the energy.

17. The converter of claim 14,
wherein the second controller is controlled to turn off the second switch to feed back the message to the primary side circuit; and the first controller controls the primary side circuit to transfer the energy to the secondary side circuit if the first controller detects the message.

18. The converter of claim 17, wherein the second controller is a synchronous rectifier (SR) controller.

* * * * *